(12) United States Patent
Gibson

(10) Patent No.: US 9,824,252 B1
(45) Date of Patent: Nov. 21, 2017

(54) CHEMICAL SENSORS BASED ON CHIPLESS RADIO FREQUENCY IDENTIFICATION (RFID) ARCHITECTURES

(71) Applicant: XEROX CORPORATION, Norwalk, CT (US)

(72) Inventor: George A. Gibson, Fairport, NY (US)

(73) Assignee: XEROX CORPORATION, Norwalk, CT (US)

(*) Notice: Subject to any disclaimer, the term of this patent is extended or adjusted under 35 U.S.C. 154(b) by 0 days.

(21) Appl. No.: 15/154,738

(22) Filed: May 13, 2016

(51) Int. Cl.
G06K 7/00 (2006.01)
G06K 7/10 (2006.01)
C08F 116/06 (2006.01)
C08F 120/06 (2006.01)
C08G 73/06 (2006.01)

(52) U.S. Cl.
CPC ........ *G06K 7/10366* (2013.01); *C08F 116/06* (2013.01); *C08F 120/06* (2013.01); *C08G 73/0611* (2013.01)

(58) Field of Classification Search
CPC .................................................. G06K 6/10366
USPC ......................................................... 340/10.1
See application file for complete search history.

(56) References Cited

U.S. PATENT DOCUMENTS

| 4,829,274 | A * | 5/1989 | Green | H01P 1/2136 333/202 |
| 2014/0028330 | A1* | 1/2014 | Potyrailo | G01N 33/0073 324/633 |
| 2015/0302231 | A1* | 10/2015 | Makimoto | H01P 1/20363 340/10.1 |

FOREIGN PATENT DOCUMENTS

EP 2937712 A1 10/2015
WO 2009/126999 A1 10/2009

OTHER PUBLICATIONS

Preradovic et al., "Fully Printable Chipless RFID Tag," Advanced Radio Frequency Identification Design and Applications, Stevan Preradovic, Ed., ISBN 978-953-307-168-8, InTech (2011).
Chang et al., "Functional antenna integrated with relative humidity sensor using synthesised polyimide for passive RFID sensing," Electron. Lett., vol. 43, No. 5, pp. 7-8, Mar. 2007.
Oprea et al., "Capacitive humidity sensors on flexible RFID labels," Sens. Actuators B, Chem., vol. 132, No. 2, pp. 104-410, Jun. 2008.
Deng et al., "A CMOS Humidity Sensor for Passive RFID Sensing Applications," Sensors (Basel). May 2014; 14(5): 3728-8739.
Ogura et al., "A Conductive and Humidity-Sensitive Composite Film Derived from Poly(o-phenylenediamine) and Polyvinyl Alcohol," J. Electrochem., Soc., vol. 142, No. 9, Sep. (1995).

(Continued)

*Primary Examiner* — Qutbuddin Ghulamali
(74) *Attorney, Agent, or Firm* — MH2 Technology Law Group LLP

(57) ABSTRACT

A method and structure for a radio frequency identification (RFID) sensor that may be used to monitor various environmental conditions. The environmental condition measured depends on a sensor material used in the RFID sensor. The sensor material is selected based on a flux in electrical conductivity relative to its saturation of the environmental condition being monitored. The sensor material is placed between adjacent electrically conductive structures of the RFID sensor. Upon a change in the environmental condition being measure, the electrical conductivity of the sensor material changes, thereby increasing or decreasing an amplitude of a response by the RFID sensor to an interrogation by an RFID reader.

18 Claims, 5 Drawing Sheets

(56) References Cited

OTHER PUBLICATIONS

Nair et al., "A humidity sensor for passive chipless RFID applications," IEEE 2012 International Conference on RFID—Technologies and Applications (RFID-TA), pp. 29-33.

Jia et al., "A prototype RFID humidity sensor for built environment monitoring," in Proc. Educ. Technol. Training & Int. Workshop Geosci. Remote Sens., Shanghai, China, 2008, pp. 496-499.

Voutilainen, "Methods and instrumentation for measuring moisture in building structures," Ph.D. dissertation, Helsinki Univ. Technol., Espoo, Finland, 2005.

* cited by examiner

US 9,824,252 B1

CHEMICAL SENSORS BASED ON CHIPLESS RADIO FREQUENCY IDENTIFICATION (RFID) ARCHITECTURES

TECHNICAL FIELD

The present teachings relate generally to chipless radio frequency identification (RFID) tags and, more particularly, to a chemical sensor based on chipless RFID architectures.

BACKGROUND

Radio frequency identification (RFID) technology has become increasingly commonplace for use in inventory tracking, loss prevention, and other uses. An RFID system may include a transponder or tag that is placed on an object and an interrogator or reader that wirelessly receives information transmitted by the tag. RFID tags may be broadly classified as active tags that include a local power source such as a battery, or passive tags that are activated by electromagnetic waves generated by the reader that induce a current in an antenna within the tag.

RFID tags can include an electronic circuit that may be in the form of a chip or integrated circuit (IC). The chip may store data that is communicated to the reader. In contrast, a chipless RFID tag has neither an integrated circuit nor discrete active electronic components, and may be printed directly onto a substrate resulting in a lower cost than a chipped RFID tag.

A chipless RFID tag may include a receive antenna that intercepts interrogator output, a transmit antenna that broadcasts data that is received by the interrogator, and a plurality or array of resonators (i.e., a multiresonator) electrically coupled between the receive antenna and the transmit antenna. During use, the reader may output a broad band or spectrum of radio frequencies. Depending on the configuration of the multiresonator, one or more of the radio frequencies may include a frequency-dependent antenna load that is intercepted by the receive antenna and causes the multiresonator to resonate. The resonation modifies the signal that is transmitted by the transmit antenna and may be received by the interrogator. Each RFID tag may be encoded by etching a conductive film to result a specific set of patterned resonant structures that form the multiresonator. For unique identification of a particular tag from a set of tags, each transponder must be made to include a unique multiresonator design, which is an expensive process.

The receive antenna, the transmit antenna, and resonators may be prepared using one or more patterning techniques to pattern a conductive layer, for example a metal layer. Various patterning techniques may be used, for example, stamping, chemical etching, mechanical etching, laser etching, direct writing of a metal layer, vapor deposition, etc.

As a practical matter, RFID technology uses radio frequencies that have much better penetration characteristics to material than do optical signals, and will work under more hostile environmental conditions than bar code labels. Therefore, the RFID tags may be read through paint, water, dirt, dust, paper, human bodies, concrete, or through the tagged item itself. RFID tags may be used in managing inventory, automatic identification of cars on toll roads, security systems, electronic access cards, keyless entry and the like.

Sensors for detecting various environmental conditions such as temperature, relative humidity, concentration of hydrogen ions (pH), the presence of various chemicals, as well as other conditions are well known and based on various different technologies. These sensors can include a substantial number of electronic components that may require manual assembly, and are there for costly. In many instances it is desirable to be apprised of the state of a remote environment or an environment that may not be easily inspected (e.g., the inside of a package).

A sensor for detecting various environmental conditions that is less expensive than conventional sensors would be a welcome addition to the art.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an embodiment, a radio frequency identification (RFID) device according to an embodiment of the present teachings may include a receive antenna, a transmit antenna, a multiresonator comprising a plurality of resonators, wherein the multiresonator is electrically coupled between the receive antenna and the transmit antenna, and a sensor material bridging two or more electrically conductive structures of the RFID device, wherein the sensor material has a variable electrical conductivity that is configured to change depending on an environmental condition to which the sensor material is exposed.

In another embodiment, an RFID system according to an embodiment of the present teachings may include an RFID reader and an RFID sensor device configured to receive an interrogation from the RFID reader and to output a response to the RFID reader upon receipt of the interrogation. The RFID sensor device may include a receive antenna, a transmit antenna, a multiresonator comprising a plurality of resonators, wherein the multiresonator is electrically coupled between the receive antenna and the transmit antenna, and a sensor material bridging two or more electrically conductive structures of the RFID device. The sensor material may include a variable electrical conductivity that is configured to change depending on an environmental condition to which the sensor material is exposed.

In another embodiment, a method for sensing an environmental condition may include receiving a first interrogation from a radio frequency identification (RFID) reader using an RFID sensor, wherein the RFID sensor includes a receive antenna, a transmit antenna, a multiresonator comprising a plurality of resonators, wherein the multiresonator is electrically coupled between the receive antenna and the transmit antenna, and a sensor material bridging two or more electrically conductive structures of the RFID sensor, wherein the sensor material has a variable electrical conductivity that is configured to change depending on the environmental condition to which the sensor material is exposed. The method may further include outputting a first response having a first amplitude from the RFID sensor, wherein the first amplitude is dependent on a first state of the environmental condition, receiving a second interrogation from the RFID reader using the RFID sensor, and outputting a second response having a second amplitude from the RFID sensor, wherein the second amplitude is different from the first amplitude and is dependent on a second state of the environmental condition.

BRIEF DESCRIPTION OF THE DRAWINGS

The accompanying drawings, which are incorporated in, and constitute a part of this specification, illustrate embodiments of the present teachings and, together with the description, serve to explain the principles of the disclosure. In the figures.

It should be noted that some details of the FIGS. have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same or like parts.

As used herein, unless otherwise specified: the term "chipless" describes a radio frequency identification (RFID) transponder that has neither an integrated circuit nor discrete electronic components, such as a transistor or coil; the term "resonator" or "resonant structure" refers to a structure having an associated resonance corresponding to a characteristic frequency; the term "spectral signature" refers to at least one identifying resonance associated with an applied excitation frequency; the term "tag" refers to a transponder or a combination of a transponder and other structures that may include a carrier on which the transponder is disposed or device package within which the transponder is disposed. A tag may be attached to an article; the term "transponder" refers to a device such as a tag that receives signals, such as those transmitted by an interrogator, and sends one or more response signals in response to the received signals; the term "etched" refers to a process by which portions of a material are removed, such as a chemical etch, a mechanical etch, a laser etch or ablation, etc.; the term "security overlayer" refers to a layer that, when tampered with, damages, destroys or otherwise modifies a structure on which the security overlayer is disposed; the term "generic RFID transponder" means an RFID transponder that has an associated resonant structure for each frequency domain applied by a transmitter, such as an interrogator.

Figure 1:
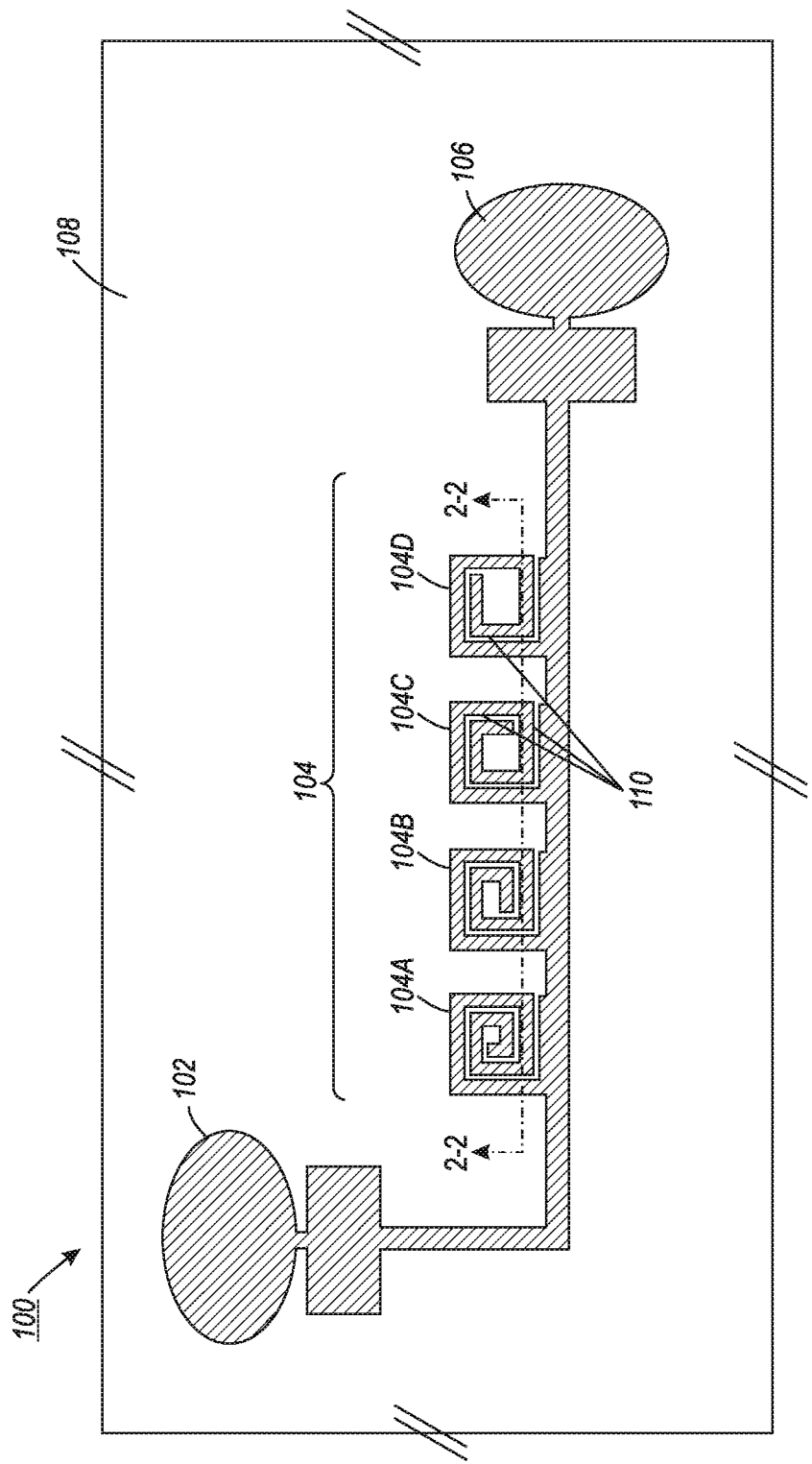
FIG. 1 is a plan view of an in-process radio frequency identification (RFID) device in accordance with an embodiment of the present teachings.
Figure 2:
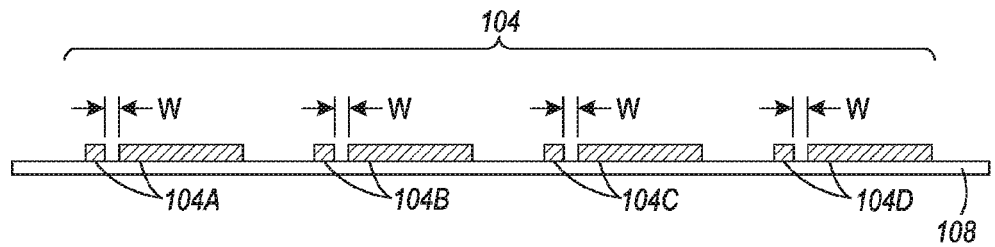
FIG. 2 is a cross section along 2-2 of the FIG. 1 structure.

FIG. 1 is a top view, and FIG. 2 is a magnified cross section along 2-2 of FIG. 1, depicting a portion of a transponder 100 that is part of an RFID tag. Transponder 100 can include a receive antenna 102, a multiresonator 104 including a plurality of resonators 104A-104D, and a transmit antenna 106. As depicted in FIG. 1, each resonator 104A-104D has a unique spiral pattern that causes each resonator to resonate at a different frequency. In an embodiment, an interstitial space, area, or region 110 between adjacent arms of the spirals within a resonator may have a width "W" as depicted in FIG. 2 of about 0.5 times a linewidth of the conductive line that forms or provides the arms of the multiresonator spiral. The multiresonator and, more particularly, each resonator spiral and interstitial space, is designed such that the interstitial space 110 does not cause an unintended resonance. It will be appreciated that an RFID tag can include other structures that are not depicted for simplicity, while various depicted structures may be removed or modified.

In use, the interrogator outputs a broad spectrum of frequencies that may be received by the receive antenna 102, and that may cause one or more of the resonators 104A-104D to resonate. The number of resonators 104A-104D that resonate and the amplitude (e.g., magnitude and/or phase) at which they resonate results in an output frequency that is translated into an analog signal that is transmitted as a response signal by the transmit antenna 106 to the interrogator. For example, and without limitation to the frequencies specified, resonator 104A may resonate at 2.97 gigahertz (GHz), resonator 104B may resonate at 2.66 GHz, resonator 104C may resonate at 24 GHz, and resonator 104D may resonate at 24.3 GHz. Because the analog signal generated during an interrogation and transmitted by the transmit antenna 106 is unique to the specific tag from a plurality of tags as a result of the unique pattern of resonators 104A-104D, the interrogator can identify the specific tag from the plurality of tags. The transponder 100 may be disposed on a carrier 108 such as directly on an article or on an intermediate adhesive backing for attaching onto an article. The carrier 108 may be a substrate on which the RFID transponder is initially fabricated or may be a carrier on which an RFID transponder is transferred onto after it is fabricated. A carrier 108 having an adhesive backing may allow the RFID transponder to be easily attached (i.e., tagged) onto an article.

An embodiment of the present teachings can include an RFID device that may be used as a sensor to detect one or more environmental conditions, as well as a method for forming the RFID device.

Figure 3:
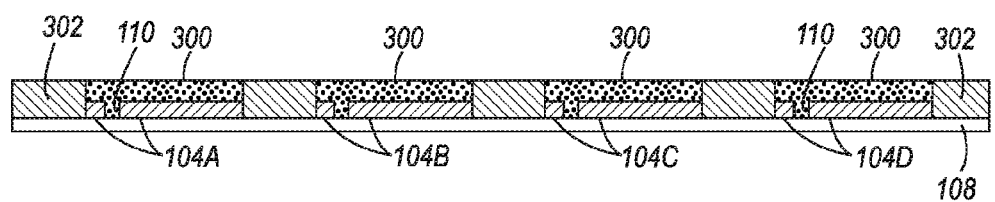
FIG. 3 is a cross section of an in-process multiresonator in accordance with an embodiment of the present teachings.

As depicted in FIG. 3, after forming the multiresonator 104 of FIG. 2, a sensory or sensor material 300 is disposed at least within the interstitial spaces 110 between adjacent arms of each resonator 104A-104D. The sensor material 300 is a material that changes electrical conductivity with changes in the environmental condition being measured. Various sufficient materials and methods of formation are discussed below.

In one embodiment, the sensor material 300 may be deposited or otherwise dispensed over the multiresonator 104 as depicted in FIG. 3. FIG. 3 further depicts a patterned mask 302 that may be formed over the carrier 108 to expose first regions where the sensor material 300 is to be formed and to cover second regions where the sensor material 300 is to be excluded. In one embodiment, the sensor material 300 may be a solid such as a powder or a gel that is dispensed over the mask 302 and over the multiresonator 104, and then removed from the masked regions. The removal from the masked regions may be performed, for example, using a blade such blade manufactured, for example, from a polymer such as silicone, or other suitable material.

In another embodiment, the sensor material 300 may be dispensed as a liquid solution including a solute suspended within a solvent. In this embodiment, the solution may be dispensed over the resonators 104A-104D using the mask 302 to contain the solution to the regions of the multiresonator 104. The solvent may then be removed using an appropriate curing process, leaving the solute as a solid.

Figure 4:
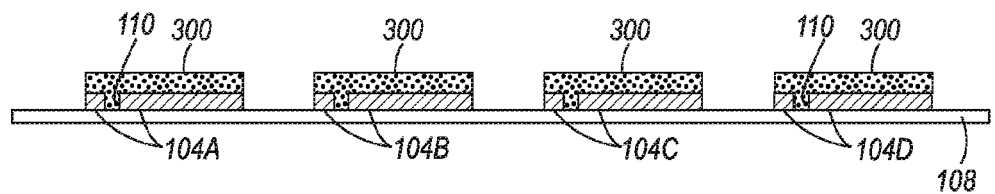
FIG. 4 is a cross section of an in-process multiresonator in accordance with an embodiment of the present teachings.

In either of these processes, after dispensing and performing any necessary curing of the sensor material 300, the mask 302 may be removed to result in a structure similar to that depicted in FIG. 4.

Figure 5:
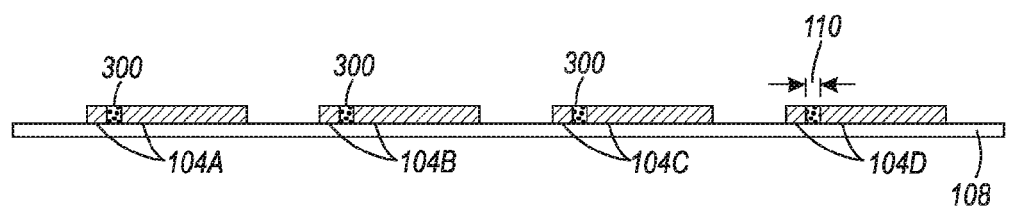
FIG. 5 is a cross section of an in-process multiresonator in accordance with an embodiment of the present teachings.

It will be appreciated that, for the FIG. 4 structure, the resonators 104A-104D have a first thickness extending from the lower surface contacting the carrier 108 to the top surface that is substantially parallel with the carrier 108. Further, the sensor material 300 has a second thickness extending from the lower surface contacting the carrier 108 at the interstitial spaces 110, wherein the second thickness is greater than the first thickness. This results in the sensor material 300 being formed over the top of the multiresonators 104, such that the sensor material 300 is not confined to only the interstitial spaces 110. Depending on various design characteristics of the multiresonator 104 and the chemical composition, density, and flexibility or rigidity of the sensor material 300, the sensor material 300 formed over a top surface the resonators 104A-104D may have a relatively large dampening effect on the resonation of the multiresonator 104 in response to an interrogation (i.e., interrogation signal or "chirp"). In some uses and/or RFID designs, this dampening may be desired or acceptable. In other uses and/or RFID designs, this dampening may be excessive or not desired. Therefore, in some uses, the thickness of the sensor material 300 may be reduced. The reduction in thickness may be performed after forming the FIG. 4 structure, for example, by performing a vertical planarization or buffing process to result in the structure of FIG. 5. In another embodiment, a smaller quantity of the sensor material 300 may be dispensed at FIG. 3, such that the sensor material is not dispensed over the top surface of the resonators 104A-104D. The amount of sensor material 300 dispensed, however, should be sufficient to bridge the interstitial spaces 110 and physically contact the arms of the resonators 104A-104D on either side of the interstitial spaces 110 as depicted in FIG. 5 subsequent to any curing process.

Figure 6:
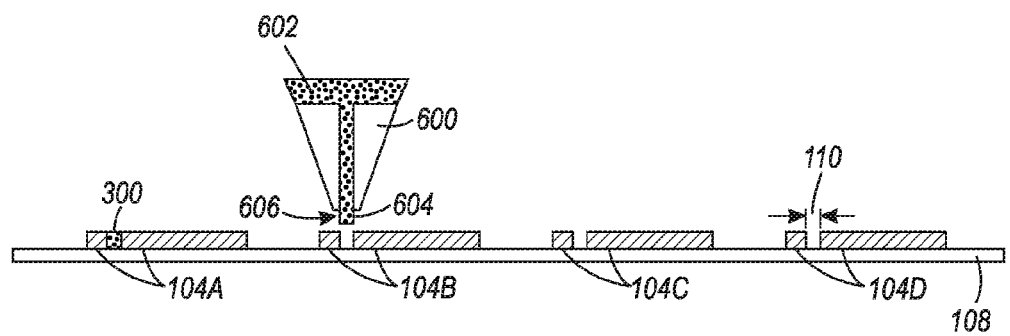
FIG. 6 is a cross section of an in-process multiresonator in accordance with an embodiment of the present teachings.

In another embodiment, the sensor material 300 may be dispensed directly into only the interstitial spaces 110 such that a mask is not required. For example, the sensor material 300 may be dispensed using a dispensing tip 600 in fluid communication with a sensor material supply 602 as depicted in FIG. 6. An amount of sensor material 604 from the sensor material supply 602 may be dispensed from an opening 606 in the dispensing tip 600 as depicted. The sensor material 604 may be dispensed as a solid, for example a powder, as a liquid, or as a gel. A carrier gas may be used to improve dispensing of the sensor material 604, particularly if the sensor material 604 is dispensed as a powder. The sensor material 604 may be dispensed from the opening under a pressure sufficient to expel the sensor material 604 at a desired flow rate for a given speed of the dispensing tip 600 across the multiresonator 104.

After dispensing the sensor material, the sensor material 300 within the interstitial spaces 110 is cured using an appropriate curing process. For example, the sensor material 300 may be heated to remove a solvent or to flow and solidify a powder such that the sensor material 300 becomes physically stable within the interstitial space to prevent the material from dislodging during subsequent processing or use.

After forming the sensor material 300, any additional processing of the RFID device may be completed to form the final RFID device that is suitable for use.

As discussed above, the sensor material 300 is a material having a variable electrical conductivity. The electrical conductivity of the sensor material 300 is a function of an environmental condition that is being measured, for example, relative humidity (RH), pH, temperature, the presence of certain gaseous components, etc. As the electrical conductivity of these films increases, the attenuation of a broad band interrogation signal received by the antenna increases in the region of the frequency of the resonant structure. In other words, the resonation amplitude of a resonator in response to an interrogation is inversely proportional to the electrical conductivity of the sensor material 300. Accordingly, the strength of the attenuation can be correlated with the environmental condition (RH, pH, etc.) within which the tag is located.

A sensor for detecting RH may be formed by filling the interstitial spaces 110 with a sensor material 300 that changes electrical conductivity with a change in relative humidity. For example, the electrical conductivity of polyvinyl alcohol (PVA) is proportional to relative humidity, with the electrical conductivity increasing as the PVA moistens from the absorption of moisture from surrounding air, and decreasing as the PVA dries or desiccates with decreasing humidity. In this case, the resonation of the multiresonator 104 in response to an interrogation decreases with increasing humidity.

An RFID device design manufactured as an RH sensor using PVA may be correlated during testing. For example, data relative to the correlation of RH percentage with resonation amplitude (response amplitude) in response to an interrogation may be determined during testing, where the response amplitude is measured over a range of known RH percentages that may be encountered by the sensor during use.

Similar devices may be constructed using other films including those sensitive to pH, the presence of other chemicals, temperature, light exposure, radiation exposure, or another environmental condition. Various materials suitable for use as an environmental sensor are discussed below.

For example, polyacrylic acid is known to change electrical conductivity with a flux in pH. As the pH of the medium becomes more acidic, the electrical conductivity of the film increases decreases. Similarly, materials such as polyvinyl alcohol, and filled compounds thereof, can be used for the measurement of RH, strain, temperature, and the presence of hazardous materials. The sensor material may include polypyrrole to monitor or measure temperature. The sensor material may include at least one of polyarylene, a filled polyarylene composite, polyvinyl alcohol, a filled polyvinyl alcohol composite, polyacrylic acid, a filled polyacrylic acid composite, a semiconductor film, a sputtered semiconductor film, a vapor-deposited semiconductor film, polypyrrole, polyaniline, polyethylene amine, poly(ethylene-co-acrylic acid), poly(vinyl alcohol)-polypyrrole-ferric chloride (PVA-PPy-FeCl$_3$) composite films, multi-walled carbon nanotube (MWCNT)/poly(vinylidene fluoride) (PVDF), polycaprolactam, Nylon-6,6, poly oxymethylene, high density polyethylene, and combinations of two or more of these. The sensor may measure or monitor a concentration of hydrogens resulting in a pH of from 1 to 12.

The amplitude of the response by the RFID sensor device to an interrogation will change (either increase or decrease) depending on the amount of saturation of the sensor material to the condition being measured. In some cases, the electrical conductivity may be proportional to the saturation, and in other cases the electrical conductivity may be inversely proportional to the saturation.

Figure 7:
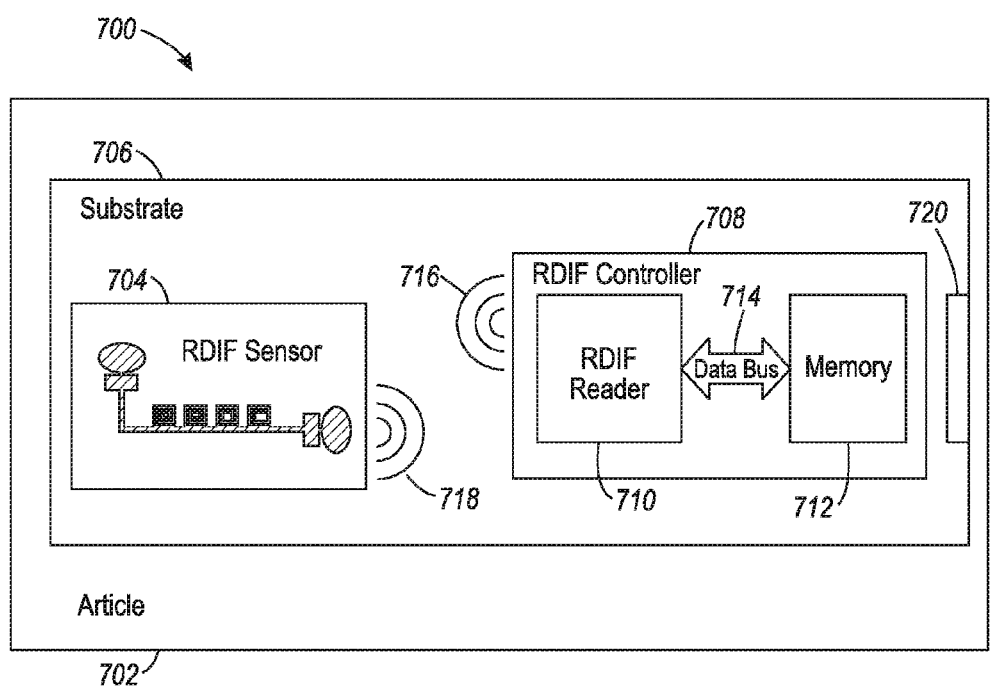
FIG. 7 is a schematic depiction of an RFID sensor system attached to an article in one exemplary use.

FIG. 7 is a schematic illustration of an RFID sensor system 700 attached to an article 702. The RFID sensor system 700 incorporates the use of an RFID sensor 704, such as an RFID sensor as described above. The RFID sensor system 700 may include a substrate 706 that provides a base for the RFID sensor system 700. The RFID sensor 704 and an RFID controller 708 may be formed upon, or otherwise attached, to the substrate 706. The RFID controller 708 may include an RFID reader 710 in electrical communication with memory 712 through a data bus 714.

It will be appreciated that, during transport, storage, or use of the article 702, the environmental conditions being monitored by the RFID sensor 704 are likely to change and thus continuous monitoring of the condition may be required. The RFID controller 708 may be programmed to interrogate the RFID sensor 704 via a chirp 716 either continuously or at preprogrammed intervals. The amplitude of a response 718 from the RFID sensor 704 to the RFID controller 708 will depend on the saturation of the RFID sensor 704 and, more particularly, the sensor material 300 (FIG. 3) of the RFID sensor 704.

During use, the RFID controller 708 sends out an interrogation to the RFID sensor 704 via the chirp 716. The RFID sensor 704 issues a response 718 that is received by the RFID controller 708. Data corresponding to the amplitude of the response 718 received by the RFID controller 708 is written, for example by the RFID reader 710, to the memory 712 through the data bus 714. Subsequently, the monitoring data may be downloaded from the memory, either wirelessly or through a wired connector 720 of the RFID sensor system 700, for analysis.

Figure 8:
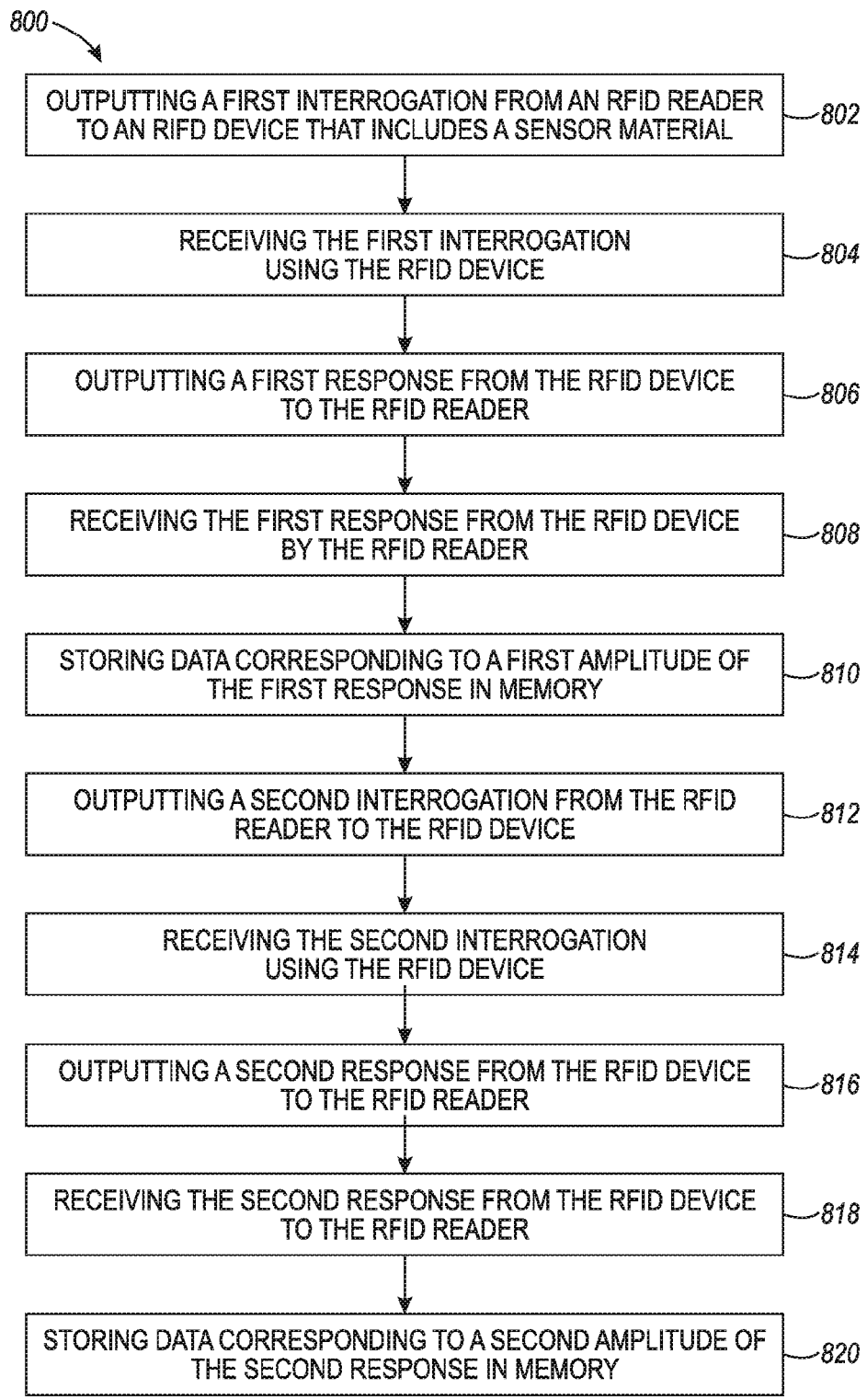
FIG. 8 is a flow diagram of a method for sensing an environmental condition using an RFID device according to an embodiment of the present teachings.

FIG. 8 is a flow chart of a method for sensing an environmental condition that may employ the use of the RFID device described above. In an embodiment, an RFID reader outputs a first interrogation signal to an RFID device that includes a sensor material as shown at 802. As described above, the RFID sensor can include the receive antenna, the transmit antenna, and the multiresonator that includes a plurality of resonators, wherein the multiresonator is electrically coupled between the receive antenna and the transmit antenna. The RFID sensor may further include the sensor material bridging two or more electrically conductive structures of the RFID device, wherein the sensor material has a variable electrical conductivity that is configured to change depending on the environmental condition to which the sensor material is exposed.

At 804, the RFID sensor receives a first interrogation from the RFID reader. At 806, a first response is output from the RFID sensor to the RFID reader, which is received by the RFID reader at 808. The first response has a first amplitude that is dependent on a first state of the environmental condition. A resonation amplitude of, for example, the multiresonator, the transmit antenna, the receive antenna, or another RFID sensor structure may be attenuated by a first amount during the first response dependent on a first electrical conductivity of the sensor material to provide the first response.

Data corresponding to the first amplitude of the first response may be stored in memory at 810. Subsequently, the RFID reader may output a second interrogation at 812 that is received by the RFID sensor at 814, and a second response may be output from the RFID device at 816 that is received by the RFID reader at 818. A resonation amplitude of, for example, the multiresonator, the transmit antenna, the receive antenna, or another RFID sensor structure may be attenuated by a second amount during the second response dependent on a second electrical conductivity of the sensor material to provide the second response.

Data corresponding to the second amplitude of the second response may be stored in memory at 820. It will be appreciated that the second amplitude may be different than the first amplitude if the environmental condition surrounding the RFID sensor has changed.

The amplitudes of the responses are thus variable and dependent on the state of the environmental condition that surrounds the RFID sensor, and by a second amount during the second response dependent on a second electrical conductivity of the sensor material to provide the second response.

The present teachings thus allow for an environmental sensor designed using RFID device technology. An RFID tag that allows monitoring of environmental conditions may be processed using automated manufacturing techniques, and may be manufactured at a low cost. These remote environmental sensors may be used in packaging, for example, to monitor environmental conditions such as RH, temperature, etc. In one technique, layers of materials that change conductivity in response to environmental conditions may be placed in the interstitial regions of resonant structures etched in a microwave antenna, resonator(s), receive antenna, transmit antenna, etc. In one embodiment, the interstitial regions in a meander antenna may be filled with polyvinyl alcohol (PVA), which is known to vary in conductivity with RH.

It will be appreciated that the sensor material 300 may be located at a single resonator, or two or more resonators but less than all of the resonators, or all of the resonators, of a plurality of resonators that make up the RFID multiresonator. Additionally, the sensor material may be located at RFID locations other than, or in addition to, the multiresonator, for example, the transmit antenna, the receive antenna, or at another location, that provides a flux in the response to an interrogation, where the response correlates with an environmental change being that is being measured.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:
1. A radio frequency identification (RFID) device, comprising:
a receive antenna;
a transmit antenna;
a multiresonator comprising a plurality of resonators, wherein the multiresonator is electrically coupled between the receive antenna and the transmit antenna; and
a sensor material bridging two or more electrically conductive structures of the RFID device, wherein:
the sensor material has a variable electrical conductivity that is configured to change depending on an environmental condition to which the sensor material is exposed;
a resonation amplitude of the multiresonator is configured to attenuate by a first amount dependent on a first electrical conductivity of the sensor material to provide a first response, and to output the first response having a first amplitude from the RFID sensor, wherein the first amplitude is dependent on a first state of the environmental condition; and
the resonation amplitude of the multiresonator is configured to attenuate by a second amount dependent on a second electrical conductivity of the sensor material to provide a second response, and to output the second response having a second amplitude from the RFID sensor, wherein the second amplitude is dependent on a second state of the environmental condition.

2. The RFID device of claim 1, further comprising:
a first arm of the multiresonator; and
a second arm of the multiresonator spaced from the first arm by an interstitial space,
wherein the sensor material is positioned within the interstitial space and bridges a width of the interstitial space between the first arm and the second arm.

3. The RFID device of claim 2, wherein the sensor material comprises at least one of polyvinyl alcohol, a filled polyvinyl alcohol composite, polyacrylic acid, a semiconductor film, a sputtered semiconductor film, a vapor-deposited semiconductor film, polypyrrole, polyaniline, polyethylene amine, poly(ethylene-co-acrylic acid), poly(vinyl alcohol) polypyrrole ferric chloride (PVA PPy FeCl3) composite films, multi-walled carbon nanotube (MWCNT)/poly (vinylidene fluoride) (PVDF), polycaprolactam, Nylon-6,6, poly oxymethylene, high density polyethylene, and combinations of two or more of these.

4. The RFID device of claim 2, wherein the sensor material comprises polyvinyl alcohol and the RFID device is further configured to monitor or measure relative humidity.

5. The RFID device of claim 2, wherein the sensor material comprises polyacrylic acid and the RFID device is further configured to monitor or measure a concentration of hydrogen ions that result in a pH of from 1 to 12.

6. The RFID device of claim 2, wherein the sensor material comprises polypyrrole and the RFID device is further configured to monitor or measure temperature.

7. A radio frequency identification (RFID) system, comprising:
an RFID reader; and
an RFID sensor device configured to receive an interrogation from the RFID reader and to output a response to the RFID reader upon receipt of the interrogation, wherein the RFID sensor device comprises:
a receive antenna;
a transmit antenna;
a multiresonator comprising a plurality of resonators, wherein the multiresonator is electrically coupled between the receive antenna and the transmit antenna; and
a sensor material bridging two or more electrically conductive structures of the RFID device, wherein:
the sensor material has a variable electrical conductivity that is configured to change depending on an environmental condition to which the sensor material is exposed;

a resonation amplitude of the multiresonator is configured to attenuate by a first amount dependent on a first electrical conductivity of the sensor material to provide a first response, and to output the first response having a first amplitude from the RFID sensor, wherein the first amplitude is dependent on a first state of the environmental condition; and the resonation amplitude of the multiresonator is configured to attenuate by a second amount dependent on a second electrical conductivity of the sensor material to provide a second response, and to output the second response having a second amplitude from the RFID sensor, wherein the second amplitude is dependent on a second state of the environmental condition.

8. The RFID system of claim 7, further comprising an RFID controller comprising the RFID reader and further comprising memory configured to store data corresponding to an amplitude of the response received by the RFID reader.

9. The RFID system of claim 8, further comprising:
a first arm of the multiresonator; and
a second arm of the multiresonator spaced from the first arm by an interstitial space,
wherein the sensor material is positioned within the interstitial space and bridges a width of the interstitial space between the first arm and the second arm.

10. The RFID system of claim 9, wherein the sensor material comprises at least one of polyvinyl alcohol, polyacrylic acid, a filled polyacrylic acid composite, polyarylene, and a filled polyarylene composite.

11. The RFID system of claim 9, wherein the sensor material comprises polyvinyl alcohol and the RFID device is further configured to monitor or measure relative humidity.

12. The RFID system of claim 9, wherein the sensor material comprises polyacrylic acid and the RFID device is further configured to monitor or measure a concentration of hydrogen ions.

13. The RFID system of claim 8, wherein the sensor material comprises polypyrrole and the RFID device is further configured to monitor or measure temperature.

14. A method for sensing an environmental condition, comprising:
receiving a first interrogation from a radio frequency identification (RFID) reader using an RFID sensor, wherein the RFID sensor comprises:
a receive antenna;
a transmit antenna;
a multiresonator comprising a plurality of resonators, a first arm of the multiresonator, and a second arm of the multiresonator spaced from the first arm by an interstitial space, wherein the multiresonator is electrically coupled between the receive antenna and the transmit antenna; and
a sensor material within the interstitial space and bridging a width of the interstitial space between the first arm and the second arm, wherein the sensor material has a variable electrical conductivity that is configured to change depending on the environmental condition to which the sensor material is exposed;
attenuating a resonation amplitude of the multiresonator by a first amount dependent on a first electrical conductivity of the sensor material to provide a first response;
outputting the first response having a first amplitude from the RFID sensor, wherein the first amplitude is dependent on a first state of the environmental condition;
receiving a second interrogation from the RFID reader using the RFID sensor;
attenuating the resonation amplitude of the multiresonator by a second amount dependent on a second electrical conductivity of the sensor material to provide a second response, wherein the first amount is different than the second amount; and
outputting the second response having a second amplitude from the RFID sensor, wherein the second amplitude is different from the first amplitude and is dependent on a second state of the environmental condition.

15. The method of claim 14, wherein the sensor material comprises at least one of polyvinyl alcohol, a filled polyvinyl alcohol composite, polyacrylic acid, a semiconductor film, a sputtered semiconductor film, a vapor-deposited semiconductor film, polypyrrole, polyaniline, polyethylene amine, poly(ethylene-co-acrylic acid), poly(vinyl alcohol)-polypyrrole-ferric chloride (PVA-PPy-FeCl3) composite films, multi-walled carbon nanotube (MWCNT)/poly(vinylidene fluoride) (PVDF), polycaprolactam, Nylon-6,6, poly oxymethylene, high density polyethylene, and combinations of two or more of these, and the method comprises monitoring or measuring at least one of relative humidity, concentration of hydrogen ions, and temperature.

16. The method of claim 14, wherein the sensor material comprises polyvinyl alcohol and the method comprises monitoring or measuring relative humidity.

17. The method of claim 14, wherein the sensor material comprises polyvinyl alcohol and the method further comprises monitoring or measuring a concentration of hydrogen ions.

18. The method of claim 14, wherein the sensor material comprises polyacrylic acid and the method further comprises monitoring or measuring relative humidity.

* * * * *